2,871,238

2-NITROSOIMINO-1,3,4,6H THIADIAZINES AND METHODS FOR THEIR PREPARATION

James T. Gregory, Akron, Ohio, assignor to The B. F. Goodrich Company, New York, N. Y., a corporation of New York No Drawing. Application February 2, 1956
Serial No. 562,938

12 Claims. (Cl. 260—243)

This invention relates to 2-nitrosoimino-1,3,4,6H thiadiazines and to methods for their preparation and more particularly pertains to compounds having the generic structure

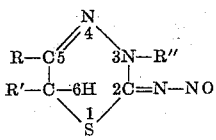

in which R and R' each represents or is selected from the class consisting of hydrogen and hydrocarbon groups preferably containing no aliphatic unsaturation and R" is selected from the class consisting of alkyl, phenyl, halophenyl, nitrophenyl and alkyl substituted phenyl groups and to methods for preparing the compounds by reacting a 2-imino-3-substituted-1,3,4,6H thiadiazine with nitrous acid.

The 2-imino-1,3,4,6H thiadiazines used as starting materials can be prepared by reacting equimolar proportions of a carbonyl compound having a thiocyano group alpha to the carbonyl group and having the structure

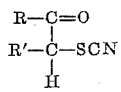

with a substituted hydrazine having the structure R"—NH—NH$_2$ under acid conditions in an inert diluent at an elevated temperature. In these formulas R, R' and R" have the same designation as that given above. The diluent can be a mixture of ethanol and water, and the acid can be a strong mineral acid such as HCl. The 2-imino-substituted-1,3,4,6H thiadiazines and methods for their preparation are disclosed as claimed in my co-pending applicaton Seral No. 536,026, filed September 22, 1955.

The nitrosoimino compounds of this invention are excellent retarders in natural rubber stocks cured with mercapto-benzothiazole. When used in a proportion of one-half part with an equal amount of mercaptobenzothiazole for each 100 parts of rubber the scorch time was 12.1 minutes and cure rate (M/T) was 13.6. Without the nitrosoimino compound one-half part of mercapto-benzothiazole shows a scorch time of 7.0 minutes and a cure rate of 13.

Representative 2-imino-1,3,4,6H thiadiazines which can be reacted with nitrous acid to form the nitroso derivatives of this invention include 2-imino-3-phenyl-1,3,4,6H-thiadiazine, 2-imino-3-ethyl-1,3,4,6H-thiadiazine, 2-imino-3 - halophenyl - 1,3,4,6H - thiadiazine, 2-imino-3-methyl-1,3,4,6H-thiadiazine, 2-imino-3-phenyl-6-methyl-1,3,4,6H-thiadiazine, 2 - imino - 3 - ethyl-6-methyl-1,3,4,6H-thiadiazine, 2-imino-3-phenyl-5,6-dimethyl-1,3,4,6H-thiadiazine, 2 - imino - 3 - ethyl - 5,6 - dimethyl-1,3,4,6H-thiadiazine, 2-imino - 3 - phenyl-5-ethyl-6-methyl-1,3,4,6H-thiadiazine, 2 - imino-3-ethyl-5-ethyl-6-methyl-1,3,4,6H-thiadiazine, 2-imino-3-phenyl-5-methyl - 1,3,4,6H - thiadiazine, 2-imino-3-ethyl-5-methyl-1,3,4,6H-thiadiazine.

The R group in the generic formula can be any saturated aliphatic hydrocarbon having from 1 to about 12 carbon atoms, alicyclic or substituted alicyclic hydrocarbon with up to about 12 hydrocarbons, or an aromatic hydrocarbon with about 12 carbon atoms.

The R' group can be an aliphatic hydrocarbon radical preferably containing from 1 to 6 carbon atoms, an alicyclic or substituted alicyclic hydrocarbon group with from 5 to 8 carbon atoms or a mono- or dinuclear aromatic hydrocarbon with from 6 to 12 carbon atoms.

The substituent in the 3 position on the imino thiadiazine is not restricted to an ethyl group as it can be any alkyl group such as methyl, propyl, isopropyl, butyl, isobutyl, pentyl, isopentyl, hexyl, isohexyl, heptyl, octyl, nonyl or other saturated aliphatic hydrocarbon groups. It can also be a cycloaliphatic hydrocarbon such as cyclohexyl, 2-methyl cyclohexyl, 3-methyl cyclohexyl, 4-methyl cyclohexyl, 2-ethyl cyclohexyl, 3-ethyl cyclohexyl, 4-ethyl cyclohexyl, 2,3-dimethyl cyclohexyl, 2,4-dimethyl cyclohexyl, 3,5-dimethyl cyclohexyl, 2-methyl-3-ethyl cyclohexyl, 2-methyl 4-ethyl cyclohexyl and other alkyl substituted cyclohexyl groups.

The aromatic groups that can be present on the nitrogen atom in the 3-position of the 2-imino-thiadiazine molecule include 2-chlorophenyl, 3-chlorophenyl, 4-chlorophenyl, 2-bromophenyl, 3-bromophenyl, 4-bromophenyl, polychlorinated and polybrominated phenyl groups, nitrophenyl groups such as 2-nitrophenyl, 3-nitrophenyl and 4-nitrophenyl, alkylated phenyl groups such as 2-methyl phenyl, 3-methyl phenyl, 4-methyl phenyl, 2,3-dimethyl phenyl, 2,4-dimethyl phenyl, 2,5-dimethyl phenyl, 2-methyl-3-ethyl phenyl, 2-methyl-4-ethyl phenyl, 2-methyl-5-ethyl phenyl, 2,3-diethyl phenyl, 2,4-diethyl phenyl, 2,5-diethyl phenyl, propyl phenyl, butyl phenyl, isobutyl phenyl, tertiary butyl phenyl and other lower alkyl substituted phenyl groups.

Polycyclic aromatic groups include naphthyl, halogenated naphthyl, nitrated naphthyl and lower alkyl substituted naphthyl groups.

All the 2-imino-3-substituted thiadiazines have the generic structure.

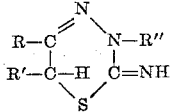

in which R, R' and R" have the same designation as above.

Although nitrous acid is stated as being one of the reactants it is apparent that any stable nitrous salt, together with an acid strong enough to form HNO$_2$ is satisfactory. Such salts include sodium nitrite, potassium nitrite, lithium nitrite, caesium nitrite, calcium nitrite, barium nitrite, magnesium nitrite, manganese nitrite, cobalt nitrite, strontium nitrite, ferrous and ferric nitrite, copper nitrite and other nitrite salts whether soluble or insoluble in water.

Mineral acids which can be used to form HNO$_2$ from the nitrous salts include sulfuric, hydrochloric and phosphoric acids. Nitric acid is also effective but its use introduces side reactions and for that reason it is not preferred.

Strong organic acids such as acetic, mono- di- or trifluoro acetic, mono-, di- or trichloro acetic, and the like can also be employed to produce HNO$_2$. Mixtures of acid can also be employed.

The examples which follow are intended to illustrate the invention but not to limit it. All parts are by weight unless otherwise indicated.

EXAMPLE I

A mixture of 75 ml. acetic acid and 20 ml. concentrated HCl was prepared in a 1 liter 3 necked flask equipped with a stirrer and thermometer. The mixture was cooled to 10° C. in an ice water bath and 10.95 parts (.05 mole) of 2-imino-3-phenyl-5,6-dimethyl-1,3,4,-6H thiadiazine were added. A solution of 3.8 parts of sodium nitrite in 50 ml. of water was added dropwise with stirring to the above mixture, while the temperature was maintained between 5° C. and 20° C. The entire reaction mixture was stirred for five minutes after the addition of the nitrite solution. Thereafter the reaction mixture was diluted with 3 times its volume of ice water. A gummy yellow precipitate was formed. The crude product melted at 124–137° C. A more purified product melted at 141–143° C. with decomposition. Further evidence of the instability to heat of the 2-nitrosoimino-3-phenyl-5,6-dimethyl-1,3,4,6H-thiadiazine is its behavior in hot organic solvents. The compound could not be recrystallized by this means as it was converted into brown, tarry decomposition products.

When tested as a slow curing accelerator at 1 part per hundred of rubber in a tire tread stock the 2-nitrosoimino-3-substituted-1,3,4,6H-thiadiazines are excellent retarders for captax accelerators.

Other 2-nitrosoimino-thiadiazines that can be prepared by the procedure described in Example I are shown in the following table:

*Table 1*

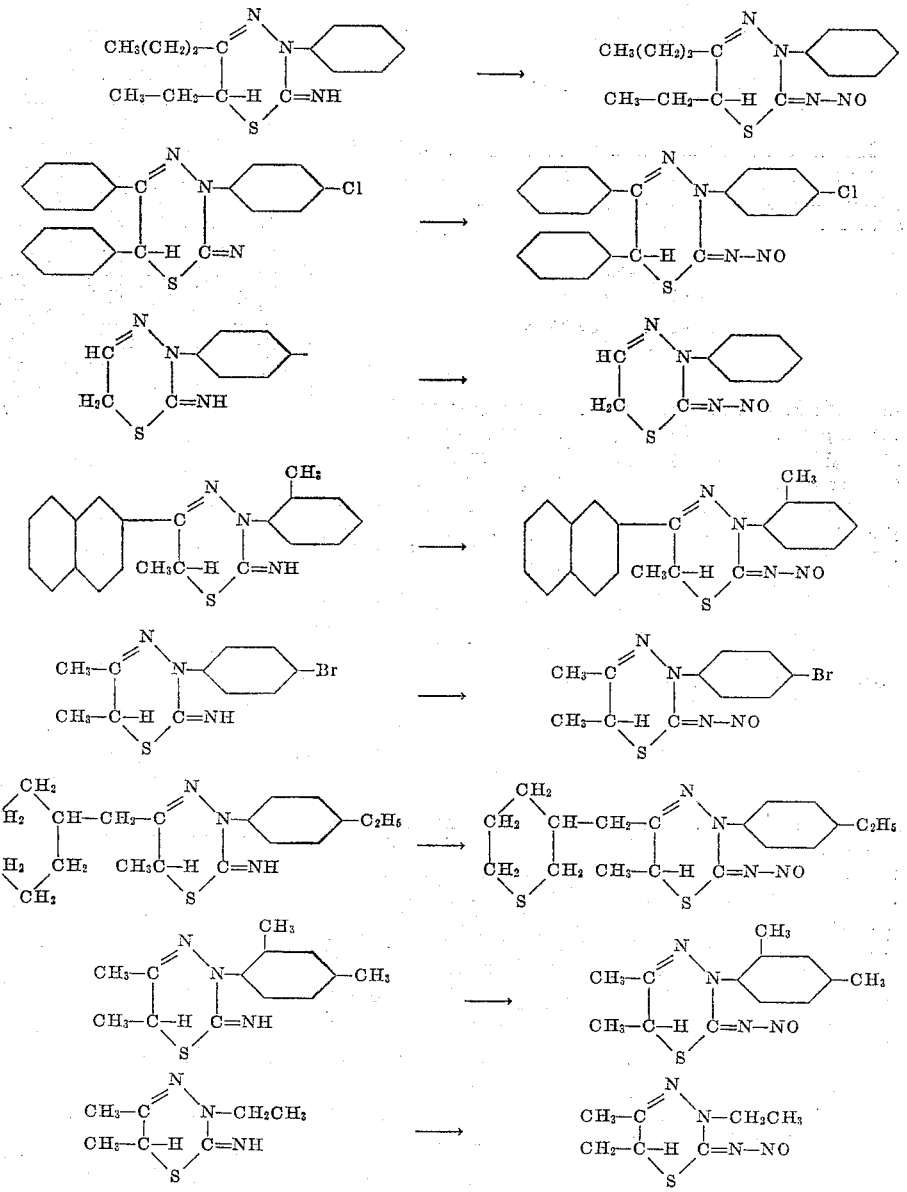

These 2-nitrosoimino compounds are also effective vulcanization retarders.

Substitution of other 2-imino-3-phenyl thiadiazines in the reaction mixture for those specifically described above will yield the corresponding nitroso-imino derivative. Also, other nitrites, which yield $HNO_2$ in the presence of a strong acid can replace sodium nitrite and any acid strong enough to yield $HNO_2$ from the nitrous salts can replace HCl.

Although this invention has been described by specific examples these are intended for illustrative purposes and are not to be considered as limitations, for it is apparent that equivalent compounds can be employed as reactants to prepare other specific members of the class of 2- nitrosoimino-3-substituted thiadiazines and the proportions of reactions and reaction conditions can be varied without departing from the spirit and scope of this invention as defined in the appended claims.

I claim:

1. Compounds having the structure

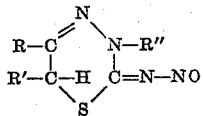

wherein R is selected from the class consisting of hydrogen, alkyl having from 1 to 12 carbon atoms, cyclohexyl substituted lower alkyl and aromatic hydrocarbon radicals having from 6 to 12 carbon atoms, R' is selected from the class consisting of hydrogen, lower alkyl and phenyl radicals and R'' is selected from the class consisting of lower alkyl, phenyl, halophenyl, nitrophenyl and lower alkyl substituted phenyl radicals.

2.

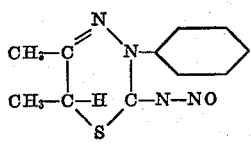

3.

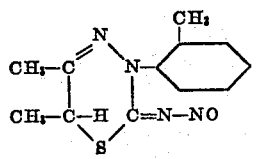

4.

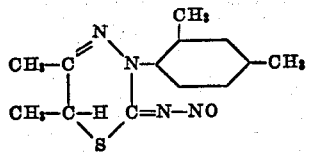

5.

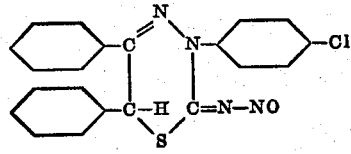

6.

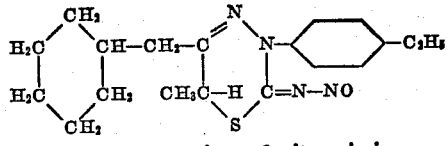

7. A method for preparing a 2-nitrosoimino compound of the structure

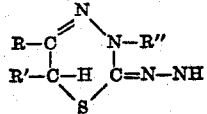

in which R is selected from the class consisting of hydrogen, alkyl having from 1 to 12 carbon atoms, cyclohexyl substituted lower alkyl, and aromatic hydrocarbon radicals having from 6 to 12 carbon atoms, R' is selected from the class consisting of hydrogen, lower alkyl and phenyl radicals and R'' is selected from the class consisting of lower alkyl, phenyl, halophenyl, nitrophenyl and lower alkyl substituted phenyl radicals comprising, reacting a compound of the structure

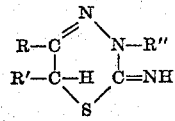

wherein R, R' and R'' each has the same designation as above with nitrous acid.

8. The method of claim 7 in which the 2-imino-thiadiazine is

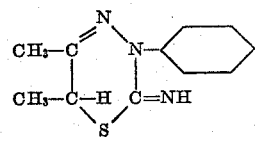

9. The method of claim 7 in which the 2-imino-thiadiazine is

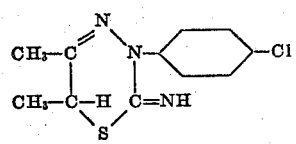

10. The method of claim 7 in which the thiadiazine is

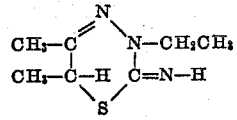

11. The method of claim 7 in which the thiadiazine is

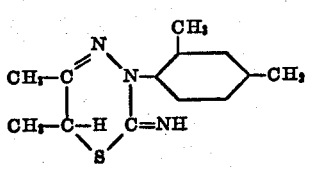

12. The method of claim 7 in which the thiadiazine is

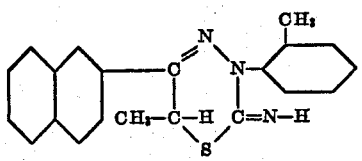

References Cited in the file of this patent

Freund: Berichte, vol. 29, page 2514 (1896).

UNITED STATES PATENT OFFICE
Certificate of Correction

Patent No. 2,871,238                                    January 27, 1959

James T. Gregory

It is hereby certified that error appears in the printed specification of the above numbered patent requiring correction and that the said Letters Patent should read as corrected below.

Column 1, line 51, for the word "Seral" read —Serial—; columns 3 and 4, Table 1, second formula, under the heading "Iminothiadiazine Reacted" should read as shown below instead of as in the patent:

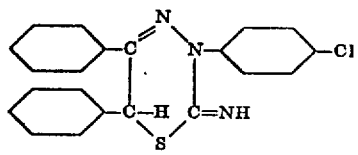

same Table 1, sixth formula under the heading "2-Nitrosoimino Thiadiazine Formed" should read as shown below instead of as in the patent:

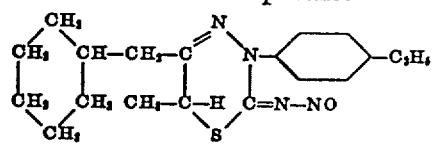

column 5, lines 21 to 26, claim 2, the formula should appear as shown below instead of as in the patent:

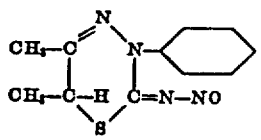

same column 5, lines 60 to 65, claim 7, the formula should appear as shown below instead of as in the patent:

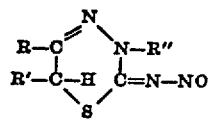

Signed and sealed this 30th day of June 1959.

[SEAL]

Attest:
KARL H. AXLINE,
Attesting Officer.

ROBERT C. WATSON,
Commissioner of Patents.